US012738506B2

(12) United States Patent
Nojima

(10) Patent No.: US 12,738,506 B2
(45) Date of Patent: Sep. 15, 2026

(54) ELECTRODE BODY, ELECTRICITY STORAGE ELEMENT, AND ELECTRICITY STORAGE MODULE

(71) Applicant: TDK CORPORATION, Tokyo (JP)

(72) Inventor: Akinobu Nojima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 807 days.

(21) Appl. No.: 17/802,641

(22) PCT Filed: Mar. 27, 2020

(86) PCT No.: PCT/JP2020/014163
§ 371 (c)(1),
(2) Date: Aug. 26, 2022

(87) PCT Pub. No.: WO2021/192256
PCT Pub. Date: Sep. 30, 2021

(65) Prior Publication Data

US 2023/0094762 A1 Mar. 30, 2023

(51) Int. Cl.
*H01M 4/66* (2006.01)
*H01M 50/46* (2021.01)

(52) U.S. Cl.
CPC .......... *H01M 4/667* (2013.01); *H01M 4/661* (2013.01); *H01M 4/668* (2013.01); *H01M 50/46* (2021.01)

(58) Field of Classification Search
CPC ...................................................... Y02E 60/10
See application file for complete search history.

(56) References Cited

U.S. PATENT DOCUMENTS

2006/0035152 A1 2/2006 Nishimura et al.
2013/0022865 A1 1/2013 Nishinaka et al.

FOREIGN PATENT DOCUMENTS

JP 2002-075456 A 3/2002
JP 2004253350 A * 9/2004
JP 2010040488 A * 2/2010
JP 2013-026057 A 2/2013
WO 2019/031091 A1 2/2019

OTHER PUBLICATIONS

Yong Polyethylene overview (Year: 2019).*
Polyethylene, Nicholas P. Cheremisinoff, P, Condensed Encyclopedia of Polymer Engineering Terms, Butterworth-Heinemann, 2001, pp. 200-255, ISBN 9780080502823, https://doi.org/10.1016/B978-0-08-050282-3.50021-4. (https://www.sciencedirect.com/science/article/pii/B9780080502823500214) (Year: 2012) (Year: 2012).*
Jun. 9, 2020 International Search Report issued in International Patent Application No. PCT/JP2020/014163.

* cited by examiner

*Primary Examiner* — Jonathan Johnson
(74) *Attorney, Agent, or Firm* — Oliff PLC

(57) ABSTRACT

An electrode body in which a battery sheet is wound around a first end thereof as an axis. The battery sheet includes: a current collector which includes a first layer and first and second metal layers; a first active material layer laminated on the first metal layer; a second active material layer laminated on the second metal layer; and a separator which comes into contact with the first or the second active material layer. The first and second metal layers are not laminated in at least a portion on the first and second surfaces of the first layer at the first end of the current collector, or the first or second metal layer is not laminated on a surface of either of the first surface or the second surface of the first layer which is on an outward side of a roll at a second end of the current collector.

8 Claims, 10 Drawing Sheets

ELECTRODE BODY, ELECTRICITY STORAGE ELEMENT, AND ELECTRICITY STORAGE MODULE

TECHNICAL FIELD

The present disclosure relates to an electrode body, a power storage element, and a power storage module.

BACKGROUND ART

Lithium ion secondary batteries are widely used as power sources for mobile devices such as portable telephones and laptop computers, hybrid cars, and the like. With development in these fields, lithium ion secondary batteries are required to have higher performance.

For example, Patent Document 1 discloses a resin current collector. The resin current collector includes a resin layer, and metal layers that are formed on both surfaces thereof. A secondary battery using a resin current collector has a high output density per weight.

PRIOR ART DOCUMENTS

Patent Document

Patent Document 1: PCT International Publication No. WO2019/031091

DISCLOSURE OF INVENTION

Problems to be Solved by the Invention

A secondary battery generates abnormal heat when it is internally short-circuited. Abnormal heat generation of a secondary battery may cause not only a malfunction of the secondary battery itself but also a malfunction of elements around the secondary battery. For example, when a metal substance such as a nail is stuck in a secondary battery from the outside, an internal short circuit occurs therein and the secondary battery generates abnormal heat.

The present disclosure has been made in consideration of the foregoing problems, and an object thereof is to provide an electrode body, a power storage element, and a power storage module using the same, which are excellent in safety even when a pressure other than ordinary use, such as nail penetration, is applied thereto.

Solutions for Solving the Problems

In order to resolve the foregoing problems, the following features are provided.

(1) An electrode body according to a first aspect is an electrode body in which a battery sheet is wound around a first end thereof as an axis. The battery sheet includes: a current collector which includes a first layer having a first surface and a second surface facing a side opposite to the first surface and including a resin, a first metal layer on the first surface of the first layer, and a second metal layer on the second surface on a side opposite to the first surface of the first layer; a first active material layer which is laminated on the first metal layer; a second active material layer which is laminated on the second metal layer; and a separator which comes into contact with at least one of the first active material layer and the second active material layer. The first metal layer and the second metal layer are not laminated in at least a portion on the first surface and the second surface of the first layer at the first end corresponding to an inward winding side of a roll of the current collector; or the first metal layer or the second metal layer is not laminated on a surface of either of the first surface or the second surface of the first layer which is on an outward side of the roll at a second end corresponding to an outward winding side of the roll of the current collector.

(2) In the electrode body according to the foregoing aspect, the first metal layer and the second metal layer may not be laminated in the first surface and the second surface of the first layer at the first end corresponding to the inward winding side of the roll of the current collector; and the first metal layer or the second metal layer may not be laminated on the surface of either of the first surface or the second surface of the first layer which is on the outward side of the roll at the second end corresponding to the outward winding side of the roll of the current collector.

(3) In the electrode body according to the foregoing aspect, the first end of the battery sheet may consist of the first layer and the separator.

(4) In the electrode body according to the foregoing aspect, the second end on a side opposite to the first end of the battery sheet may consist of the first layer and the separator.

(5) In the electrode body according to the foregoing aspect, the first layer may be an insulating layer of $1.0\times10^{9}$ Ω·cm or higher.

(6) In the electrode body according to the foregoing aspect, the first layer may include any one selected from the group consisting of polyethylene terephthalate (PET), polyimide (PI), polyamide imide (PAI), polypropylene (PP), and polyethylene (PE).

(7) In the electrode body according to the foregoing aspect, each of the first metal layer and the second metal layer may be any one selected from aluminum, nickel, stainless steel, copper, platinum, and gold.

(8) In the electrode body according to the foregoing aspect, the first metal layer and the second metal layer may include metals or alloys different from each other.

Effects of Invention

The electrode body according to the foregoing aspect is excellent in safety even when a pressure other than ordinary use, such as nail penetration, is applied thereto.

EMBODIMENTS FOR CARRYING OUT THE INVENTION

Figure 1:
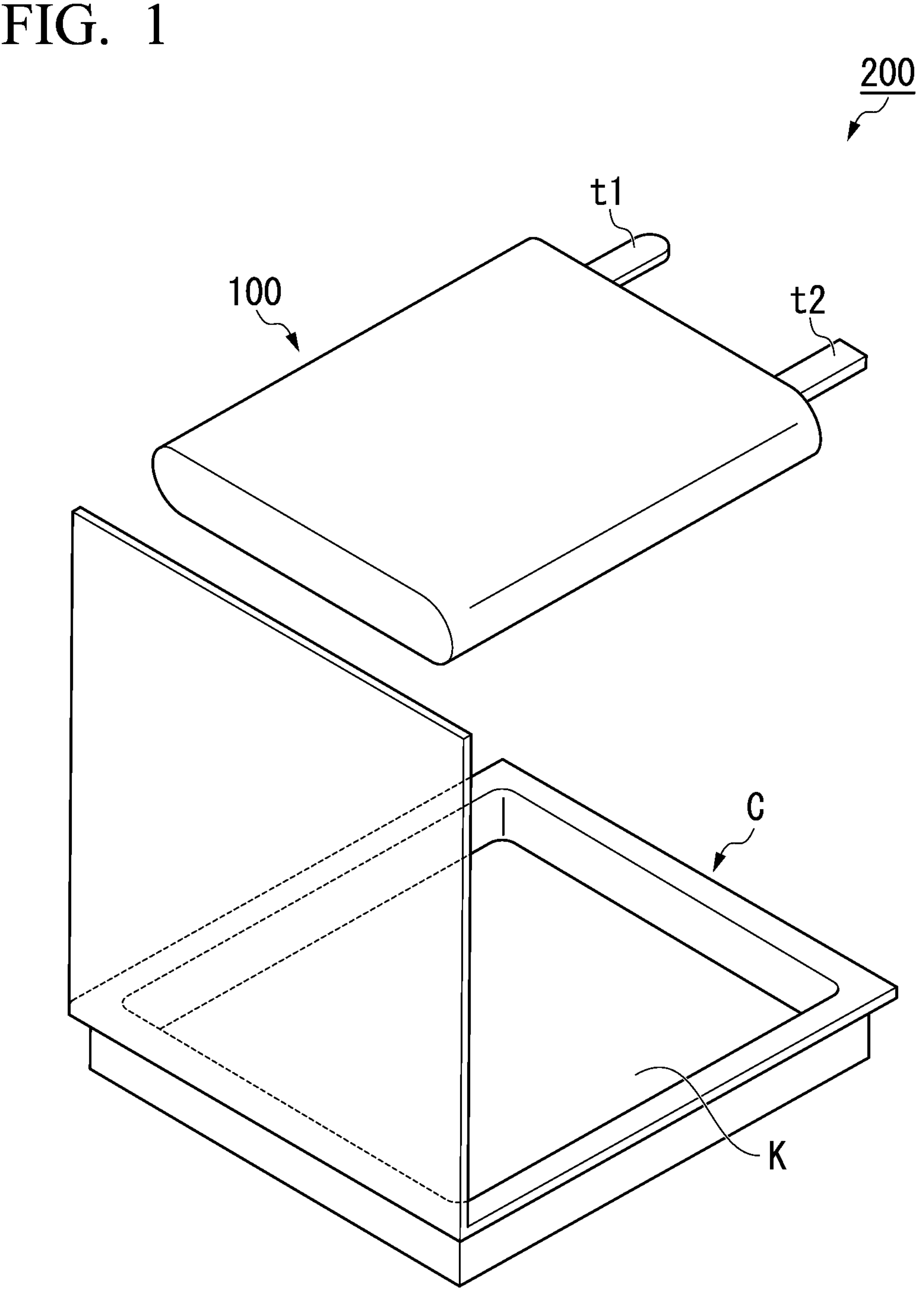
FIG. 1 is a schematic view of a power storage element according to a first embodiment.

Hereinafter, preferred examples of the present disclosure will be described in detail with reference to the accompanying drawings.

Examples of the present disclosure are provided to those skilled in the art of the technical field so as to describe the present disclosure in detail. The following Examples may be modified into various other forms, and the scope of the present disclosure is not limited to the following Examples.

In addition, in the following drawings, the thickness and the size of each layer are presented for the sake of convenience of description and clarity, and the same reference signs in the drawings indicate the same elements. As used in this specification, the term "and/or" includes any one and all combinations of one or more of the enumerated items.

The terms used in this specification are used for describing a particular example and are not intended to limit the present disclosure. As used in this specification, a singular form can include a plural form unless otherwise designated clearly in its context. In addition, when used in this specification, the term "include" identifies the presence of the shape, the number, the stage, the operation, the member, the element, and/or a group of these which have been mentioned and is not intended to exclude the presence or addition of one or more of other shapes, numbers, operations, members, elements, and/or groups thereof.

Space-related terms such as "lower portion", "below", "low", "upper portion", "above", "left", and "right" may be utilized for easy understanding of one element or characteristic with respect to other elements or characteristics illustrated in the drawings. Such space-related terms are intended to facilitate understanding of the present disclosure in terms of various states of steps or states of usage of the present disclosure and are not intended to limit the present disclosure. For example, if an element or a characteristic in the drawing is turned upside down, "lower portion" or "below" used for describing the element or the characteristic becomes "upper portion" or "above". Therefore, "lower portion" indicates a concept covering "upper portion" or "below". In addition, depending on the direction in which an element is viewed in the drawings, "left" and "right" may be reversed.

First Embodiment

FIG. 1 is a schematic view of a power storage element according to the present embodiment. For example, a power storage element 200 is a lithium ion secondary battery that is a kind of nonaqueous electrolytic solution secondary battery. In FIG. 1, in order to facilitate understanding, a state immediately before an electrode body 100 is accommodated inside an exterior body C is illustrated.

The power storage element 200 includes the electrode body 100 and the exterior body C. A structure of the electrode body 100 will be described below. The electrode body 100 is accommodated in an accommodation space K of the exterior body C together with an electrolytic solution. The electrode body 100 has tabs t1 and t2 implementing electrical connection to an external device. The tabs t1 and t2 protrude outward from the inside of the exterior body C. The tab t1 is connected to a first metal layer 12 which will be described below, and the tab t2 is connected to a second metal layer 13 which will be described below.

The tabs t1 and t2 are constituted to include a metal. For example, a metal is aluminum, copper, nickel, SUS, or the like.

For example, the tabs t1 and t2 have a rectangular shape in a view in a z direction which will be described below, but the shapes thereof are not limited to the foregoing shape and diverse shapes can be employed.

The exterior body C is intended to seal the electrode body 100 and the electrolytic solution inside thereof. The exterior body C inhibits leakage of the electrolytic solution to the outside, infiltration of moisture and the like into the electrode body 100 from the outside, and the like.

For example, the exterior body C is a metal laminate film in which a metal foil is coated with polymer films from both sides. For example, the metal foil is an aluminum foil, and for example, the polymer film is made of a resin such as polypropylene. For example, the polymer film on the outward side is made of polyethylene terephthalate (PET), polyamide, or the like, and for example, the polymer film on the inward side is made of polyethylene (PE), polypropylene (PP), or the like. In order to facilitate welding by heat, for example, the polymer film on the inward side has a lower melting point than the polymer film on the outward side.

An adhesive layer including an adhesive substance may be provided between the exterior body C and the electrode body 100. The exterior body C covers the outermost surface of the electrode body 100. An inner surface of the exterior body C faces the outermost surface of the electrode body 100. For example, the adhesive layer is located on a surface of the exterior body C facing the electrode body 100 (inner surface) or a surface of the electrode body 100 facing the exterior body C (the outermost surface of the electrode body). For example, the adhesive layer is a double-sided tape or the like which is resistant to an electrolytic solution. For example, the adhesive layer may be a layer which is obtained by forming an adhesive layer of polyisobutylene rubber on a polypropylene base material, a layer made of a rubber such as a butyl rubber, a layer made of a saturated hydrocarbon resin, or the like. The adhesive layer curbs movement of the electrode body 100 inside the exterior body C. In addition, even when a metal body such as a nail is stuck in the adhesive layer, the adhesive substance is entwined with a metal body such as a nail, and thus occurrence of a short circuit is curbed.

For example, the electrolytic solution is a nonaqueous electrolytic solution including a lithium salt or the like. The electrolytic solution is a solution in which an electrolyte is dissolved in a nonaqueous solvent, and it may contain cyclic carbonates and chain carbonates as nonaqueous solvents.

Cyclic carbonates solvate an electrolyte. For example, the cyclic carbonates are ethylene carbonate, propylene carbonate, butylene carbonate, or the like. Chain carbonates reduce a viscosity of cyclic carbonates. For example, the chain carbonates are diethyl carbonate, dimethyl carbonate, and ethyl methyl carbonate. Furthermore, chain carbonates may be used with methyl acetate, ethyl acetate, methyl propionate, ethyl propionate, propyl propionate, γ-butyrolactone, 1,2-dimethoxyethane, 1,2-diethoxyethane, or the like mixed thereinto. For example, a proportion of the cyclic carbonates:the chain carbonates is 1:9 to 1:1 in terms of volume ratio.

For example, in the nonaqueous solvent, a portion of hydrogen in the cyclic carbonates or chain carbonates may be substituted with fluorine. For example, the nonaqueous solvent may include fluoroethylene carbonate, difluoroethylene carbonate, or the like.

For example, the electrolyte is a lithium salt such as $LiPF_6$, $LiClO_4$, $LiBF_4$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, LiBOB, or the like. Regarding these lithium salts, one kind may be used alone, or two or more kinds may be used together. From a viewpoint of the degree of ionization, it is preferable to include $LiPF_6$ as an electrolyte.

When $LiPF_6$ is dissolved in the nonaqueous solvent, for example, the concentration of the electrolyte in the electrolytic solution is adjusted to 0.5 mol/L to 2.0 mol/L. If the concentration of the electrolyte is 0.5 mol/L or higher, the concentration of lithium ions in the nonaqueous electrolytic solution can be sufficiently secured, and a sufficient capacitance at the time of charging and discharging is likely to be obtained. In addition, when the concentration of the electrolyte is regulated to be 2.0 mol/L or lower, increase in coefficient of viscosity of the nonaqueous electrolytic solution can be restricted, mobility of lithium ions can be sufficiently secured, and thus a sufficient capacitance at the time of charging and discharging is likely to be obtained.

When $LiPF_6$ is mixed with other electrolytes as well, for example, it is preferable that the concentration of lithium ions in the nonaqueous electrolytic solution be adjusted to 0.5 mol/L to 2.0 mol/L and the concentration of lithium ions from $LiPF_6$ be equal to or higher than 50 mol % thereof.

For example, the nonaqueous solvent may have a room-temperature molten salt. A room-temperature molten salt is a salt which is obtained by a combination of cations and anions and is in a liquid state even if the temperature is lower than 100° C. Since a room-temperature molten salt is a liquid consisting of only ions, it has strong electrostatic interactions and is characterized by being non-volatile and nonflammable.

Regarding cation components of a room-temperature molten salt, there are nitrogen-based cations including nitrogen, phosphorus-based cations including phosphorus, sulfur-based cations including sulfur, and the like. Regarding these cation components, one kind may be included alone or two or more kinds may be included in combination.

Regarding nitrogen-based cations, there are chain or cyclic ammonium cations such as imidazolium cations, pyrrolidinium cations, piperidinium cations, pyridinium cations, and azoniaspiro cations.

Regarding phosphorus-based cations, there are chain or cyclic phosphonium cations.

Examples of sulfur-based cations include chain or cyclic sulfonium cations.

Particularly, as the cation component, N-methyl-N-propyl-pyrrolidinium (P13) that is nitrogen-based cation is preferable since this cation component has high lithium-ion conductivity and has wide resistance to oxidation and reduction when a lithium imide salt is dissolved therein.

Regarding anion components of a room-temperature molten salt, there are $AlCl_4^-$, $NO_2^-$, $NO_3^-$, $I^-$, $BF_4^+$, $PF_6^-$, $AsF_6^-$, $SbF_6^-$, $NbF_6^-$, $TaF_6^-$, $F(HF)_{23}^-$, p-$CH_3PhSO_3^-$, $CH_3CO_2^-$, $CF_3CO_2^-$, $CH_3SO_3^-$, $CF_3SO_3^-$, $(CF_3SO_2)_3C^-$, $C_3F_7CO_2^-$, $C_4F_9SO_3^-$, $(FSO_2)_2N^-$ (bis(fluorosulfonyl)imide: FSI), $(CF_3SO_2)_2N^-$ (bis(trifluoromethanesulfonyl)imide: TFSI), $(C_2F_5SO_2)_2N^-$ (bis(pentafluoroethanesulfonyl)imide), $(CF_3SO_2)(CF_3CO)N^-$ ((trifluoromethanesulfonyl)(trifluoromethanecarbonyl)imide), $(CN)_2N^-$ (dicyanoimide), and the like. Regarding these anion components, one kind may be included alone or two or more kinds may be included in combination.

Figure 2:
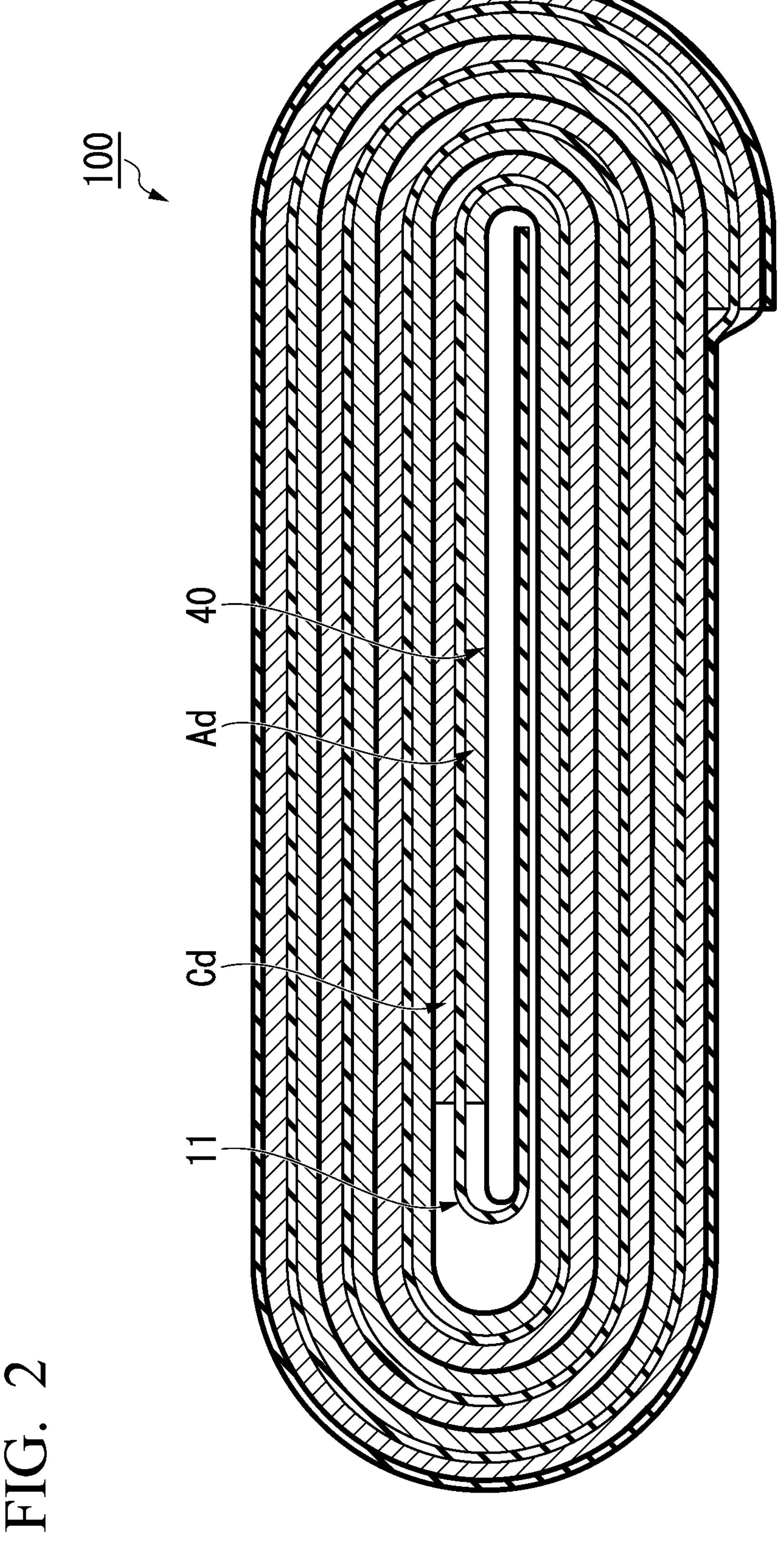
FIG. 2 is a cross-sectional view of an electrode body according to the first embodiment.

FIG. 2 is a cross-sectional view of the electrode body 100 according to the first embodiment. FIG. 2 is a cross section of the electrode body 100 orthogonal to a winding axis direction of the electrode body 100. In the electrode body 100, a battery sheet is wound around a first end thereof as an axis. The battery sheet includes a resin layer 11, a positive electrode Cd, a negative electrode Ad, and a separator 40. For example, in the electrode body 100, the separator 40, the negative electrode Ad, the resin layer 11, and the positive electrode Cd are repeatedly wound from an inward winding side toward an outward winding side in this order. For example, the negative electrode Ad is on the inward winding side of the positive electrode Cd. If the negative electrode Ad is on the inward winding side, an energy density of the power storage element 200 increases.

Figure 3:
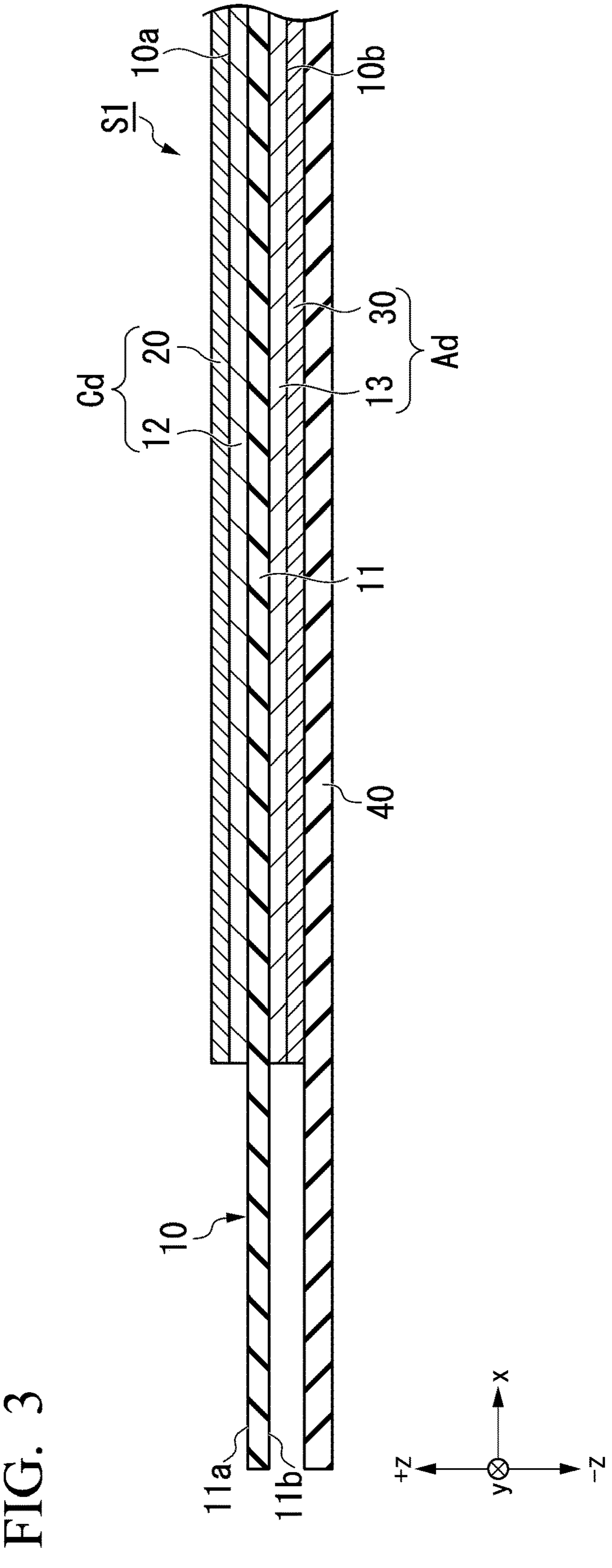
FIG. 3 is a cross-sectional view of a first end of a battery sheet in the developed electrode body according to the first embodiment.
Figure 4:
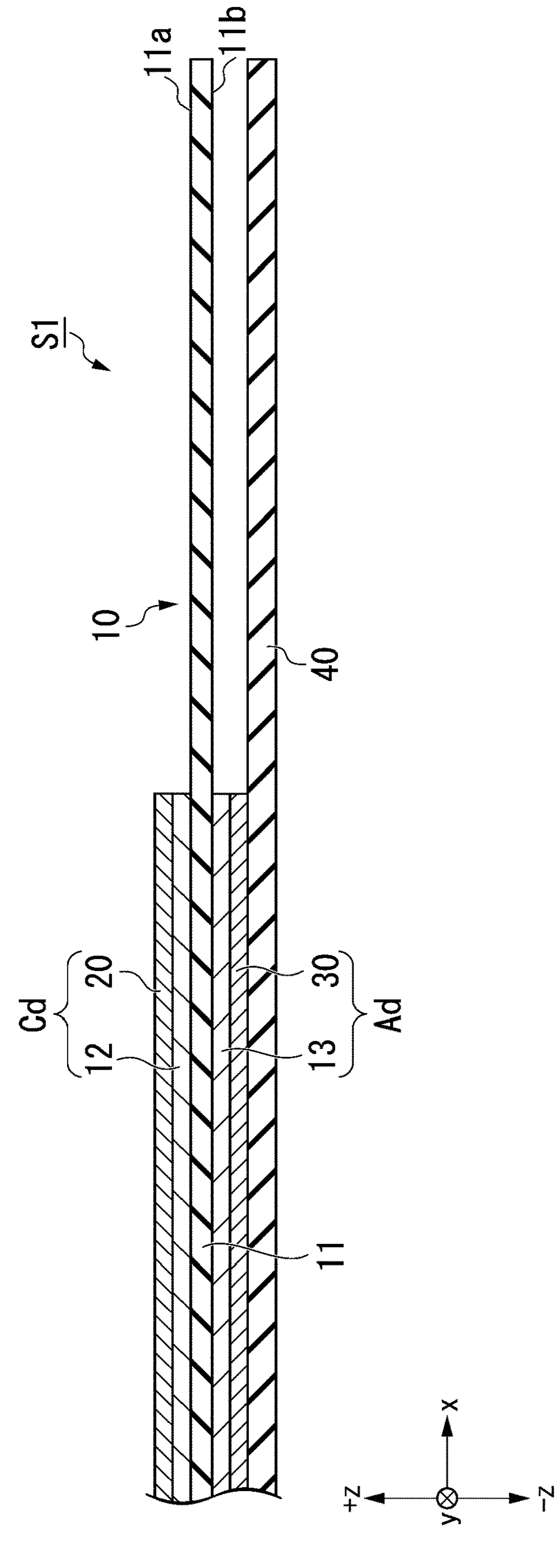
FIG. 4 is a cross-sectional view of a second end of the battery sheet in the developed electrode body according to a second embodiment.

FIG. 3 is a cross-sectional view of a first end of a battery sheet in the developed electrode body 100 according to the first embodiment. FIG. 4 is a cross-sectional view of a second end of the battery sheet in the developed electrode body 100 according to the first embodiment. For example, the electrode body 100 is wound around the left end in FIG. 3 as a winding center while having the right end in FIG. 4 as a winding outermost layer. The first end is an end portion on the inward winding side of the electrode body 100. The second end is an end portion on a side opposite to the first end and is an end portion on the outward winding side of the electrode body 100.

A lamination direction of layers of a battery sheet S will be referred to as the z direction. A direction from the second metal layer 13 toward the first metal layer 12 will be referred to as a positive z direction, and a direction opposite to the positive z direction will be referred to as a negative z direction. A direction within a plane where the battery sheet S expands will be referred to as an x direction, and a direction orthogonal to the x direction will be referred to as a y direction.

A battery sheet S1 includes a current collector 10, a positive electrode active material layer 20, a negative electrode active material layer 30, and the separator 40. The positive electrode active material layer 20 is formed on a first surface **10*a* side of the current collector 10. The negative electrode active material layer 30 is formed on a second surface 10*b* side of the current collector 10. The second surface 10*b* is a surface on a side opposite to the first surface 10*a* in the current collector 10. The current collector 10 has the first surface 10*a*, and the second surface 10*b* facing a side opposite to the first surface 10*a*. The positive electrode active material layer 20 is an example of a first active material layer. The negative electrode active material layer 30 is an example of a second active material layer. The separator 40 comes into contact with the positive electrode active material layer 20 or the negative electrode active material layer 30. The separator 40 is located between the positive electrode active material layer 20 and the negative electrode active material layer 30 in a state in which the electrode body 100** is wound.

The current collector 10 includes the resin layer 11, the first metal layer 12, and the second metal layer 13. The first metal layer 12 is formed on a first surface **11*a* side of the resin layer 11. The second metal layer 13 is formed on a second surface 11***b* side of the resin layer 11. The second surface 11*b* is a surface on a side opposite to the first surface 11*a* in the resin layer 11. For example, the first metal layer 12 is a positive electrode current collector. For example, the second metal layer 13 is a negative electrode current collector. For example, the positive electrode active material layer 20 is formed on a surface of the first metal layer 12 on a side opposite to the resin layer 11. In this case, the first metal layer 12 and the positive electrode active material layer 20 form the positive electrode Cd. For example, the negative electrode active material layer 30 is formed on a surface of the second metal layer 13 on a side opposite to the resin layer 11. In this case, the second metal layer 13 and the negative electrode active material layer 30 form the negative electrode Ad. The relationship between the first metal layer 12 and the second metal layer 13 may be reversed. The first metal layer 12 may be a negative electrode current collector, and the second metal layer 13 may be a positive electrode current collector. The first metal layer 12 and the second metal layer 13 need only be conductive layers.

At the first end of the current collector 10, the first metal layer 12 is not laminated on the first surface 11*a* of the resin layer 11, and the second metal layer 13 is not laminated on the second surface 11*b* of the resin layer 11. The first end of the current collector 10 consists of the resin layer 11. The first end of the current collector 10 is on the inward side of the electrode body 100. The innermost portion of the electrode body 100 does not include the first metal layer 12 and the second metal layer 13.

In addition, the first end of the battery sheet S1 consists of the resin layer 11 and the separator 40. The positive electrode active material layer 20 and the negative electrode active material layer 30 are not formed at the first end of the battery sheet S1. The innermost portion of the electrode body 100 consists of the resin layer 11 and the separator 40.

For example, when a nail is stuck in the electrode body 100 but does not penetrate it, a tip of the nail becomes a main factor of a cause of a short circuit. When no conductor is present in the innermost portion of the electrode body 100, a short circuit between the positive electrode Cd and the negative electrode Ad is curbed. This is because a conductive object such as a nail which may cause a short circuit is covered with the resin layer 11 so that it becomes a resistor due to decrease in conductivity. Therefore, a rapid current flow via the nail or the like and heat generation thereof can be curbed.

At the second end of the current collector 10, the first metal layer 12 is not laminated on the first surface 11*a* of the resin layer 11, and the second metal layer 13 is not laminated on the second surface 11*b* of the resin layer 11. The second end of the current collector 10 consists of the resin layer 11. The second end of the current collector 10 is on the outward side of the electrode body 100. The outermost portion of the electrode body 100 does not include the first metal layer 12 and the second metal layer 13.

In addition, the second end of the battery sheet S1 consists of the resin layer 11 and the separator 40. The positive electrode active material layer 20 and the negative electrode active material layer 30 are not formed at the second end of the battery sheet S1. The outermost portion of the electrode body 100 consists of the resin layer 11 and the separator 40.

When a nail is stuck in the electrode body 100, it is stuck therein from the outward side of the electrode body 100. Since the nail which has invaded from the outward side of the electrode body 100 is entwined with the resin layer 11 and the separator 40, the surface of the nail is coated with an insulator, and thus a short circuit between the positive electrode Cd and the negative electrode Ad is curbed.

The resin layer 11 is constituted to include a material having insulating properties. In this specification, insulating properties denote that a resistance value is $1.0\times10^9$ Ω·cm or higher. For example, the resin layer 11 is an insulating layer. The resin layer 11 is an example of a first layer. The resin layer 11 includes any one selected from the group consisting of polyethylene terephthalate (PET), polyimide (PI), polyamide imide (PAT), polypropylene (PP), and polyethylene (PE). For example, the resin layer 11 is a PET film. The resin layer 11 insulates the first metal layer 12 and the second metal layer 13 from each other. For example, a thickness of the resin layer 11 is 3 μm to 9 μm and is preferably 4 μm to 6 μm.

Each of the first metal layer 12 and the second metal layer 13 is any one selected from aluminum, nickel, stainless steel, copper, platinum, and gold. For example, the first metal layer 12 and the second metal layer 13 include metals or alloys different from each other. For example, the first metal layer 12 is aluminum. For example, the second metal layer 13 is copper. The first metal layer 12 and the second metal layer 13 may be formed of the same materials. For example, both the first metal layer 12 and the second metal layer 13 are made of aluminum. Specific constitutions of the first metal layer 12 and the second metal layer 13 will be described below.

It is preferable that both the first metal layer 12 and the second metal layer 13 be constituted using aluminum or the first metal layer 12 and the second metal layer 13 be constituted such that one of the first metal layer 12 and the second metal layer 13 is made of aluminum and the other is made of copper.

The thicknesses of the first metal layer 12 and the second metal layer 13 may be the same or different from each other. For example, the thicknesses of the first metal layer 12 and the second metal layer 13 are preferably 0.3 μm to 2 μm and are preferably 0.4 μm to 1 μm.

For example, the positive electrode active material layer 20 includes positive electrode active materials, conductive additives, and binders.

The positive electrode active materials can reversibly proceed absorbing and desorbing of lithium ions, separation and intercalation of lithium ions, or doping and de-doping of lithium ions and counter anions.

For example, the positive electrode active materials are lithium cobaltate ($LiCoO_2$), lithium nickelate ($LiNiO_2$), lithium manganate ($LiMnO_2$), lithium manganese spinel ($LiMn_2O_4$), complex metal oxide expressed by general formula: $LiNi_xCo_yMn_zM_aO_2$ ($x+y+z+a=1$, $0\leq x<1$, $0\leq y<1$, $0\leq z\leq 1$, $0\leq a<1$, and M is one or more kinds of elements selected from Al, Mg, Nb, Ti, Cu, Zn, and Cr), a lithium vanadium compound ($LiV_2O_5$), olivine-type $LiMPO_4$ (M indicates one or more kinds of elements selected from Co, Ni, Mn, Fe, Mg, Nb, Ti, Al, and Zr, or VO), lithium titanate ($Li_4Ti_5O_{12}$), complex metal oxide such as $LiNi_xCo_yAl_zO_2$ ($0.9<x+y+z<1.1$), polyacetylene, polyaniline, polypyrrole, polythiophene, polyacene, or the like. In addition, the positive electrode active materials may be mixtures of these.

The conductive additives are dotted inside the positive electrode active material layer. The conductive additives enhance the conductivity between the positive electrode active materials in the positive electrode active material layer. For example, the conductive additives are carbon powder such as carbon blacks, carbon nanotubes, carbon materials, fine powder of a metal such as copper, nickel, stainless steel, or iron, a mixture of a carbon material and a metal fine powder, or conductive oxide such as ITO. It is preferable that the conductive additives be carbon materials such as carbon black. When sufficient conductivity can be secured with active materials, the positive electrode active material layer 20 may not include conductive additives.

The binders bind the positive electrode active materials to each other in the positive electrode active material layer. Known binders can be used as the binders. For example, the binders are fluororesins. For example, fluororesins are polyvinylidene fluoride (PVDF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), polyvinyl fluoride (PVF), or the like.

In addition to the above-described materials, for example, the binders may be vinylidene fluoride-based fluororubber such as vinylidene fluoride-hexafluoropropylene-based fluororubber (VDF-HFP-based fluororubber), vinylidene fluoride-hexafluoropropylene-tetrafluoroethylene-based fluororubber (VDF-HFP-TFE-based fluororubber), vinylidene fluoride-pentafluoropropylene-based fluororubber (VDF-PFP-based fluororubber), vinylidene fluoride-pentafluoropropylene-tetrafluoroethylene-based fluororubber (VDF-PFP-TFE-based fluororubber), vinylidene fluoride-perfluoromethyl vinyl ether-tetrafluoroethylene-based fluororubber (VDF-PFMVE-TFE-based fluororubber), and vinylidene fluoride-chlorotrifluoroethylene-based fluororubber (VDF-CTFE-based fluororubber).

The negative electrode active material layer 30 includes negative electrode active materials. In addition, as necessary, it may include conductive materials, binders, and solid electrolytes.

The negative electrode active materials need only be compounds capable of absorbing and desorbing ions, and negative electrode active materials used in known lithium ion secondary batteries can be used. For example, the negative electrode active materials are metal lithium; lithium alloys; carbon materials such as graphite capable of absorbing and desorbing ions (natural graphite or artificial graphite), carbon nanotubes, hardly graphitizable carbon, easily graphitizable carbon, and low-temperature baked carbon; a metalloid or a metal such as aluminum, silicon, tin, or germanium which can be chemically combined with a metal such as lithium; amorphous compounds mainly including oxide such as $SiO_x$ ($0<x<2$) or tin dioxide; or particles including lithium titanate ($Li_4Ti_5O_{12}$) or the like.

As described above, for example, the negative electrode active material layer 30 may include silicon, tin, or germanium. Silicon, tin, or germanium may be present as a single element or may be present as a compound. For example, a compound is an alloy and oxide. As an example, when the negative electrode active materials are silicon, the negative electrode may be referred to as a Si negative electrode. For example, the negative electrode active materials may be a mixed system of a simple substance or a compound of silicon, tin, and germanium and a carbon material. For example, a carbon material is natural graphite. In addition, for example, the negative electrode active materials may be a simple substance or a compound of silicon, tin, and germanium of which a surface is covered with carbon. A carbon material and covered carbon enhance the conductivity between the negative electrode active materials and a conductive additive. If the negative electrode active material layer includes silicon, tin, or germanium, the capacitance of the power storage element 200 increases.

As described above, for example, the negative electrode active material layer 30 may include lithium. Lithium may be metal lithium or a lithium alloy. The negative electrode active material layer 30 may be made of metal lithium or a lithium alloy. For example, a lithium alloy is an alloy of one or more kinds of elements selected from the group consisting of Si, Sn, C, Pt, Ir, Ni, Cu, Ti, Na, K, Rb, Cs, Fr, Be, Mg, Ca, Sr, Sb, Pb, In, Zn, Ba, Ra, Ge, and Al, and lithium. As an example, when the negative electrode active materials are metal lithium, the negative electrode may be referred to as a Li negative electrode. The negative electrode active material layer 30 may be a lithium sheet.

The negative electrode may consist of a negative electrode current collector (second metal layer 13) without having the negative electrode active material layer 30 at the time of production. If the power storage element 200 is charged, metal lithium is precipitated on a surface of the negative electrode current collector. Metal lithium is lithium of a simple substance in which lithium ions are precipitated, and metal lithium functions as a negative electrode active material layer.

Regarding the conductive materials and the binders, materials similar to those of the positive electrode active material layer 20 can be used. In addition to those exemplified in the positive electrode active material layer 20, for example, the binders in the negative electrode active material layer 30 may be cellulose, styrene butadiene rubber, ethylene propylene rubber, a polyimide resin, a polyamide imide resin, an acrylic resin, or the like. For example, cellulose may be carboxymethyl cellulose (CMC).

For example, the separator 40 has an electrically insulating porous structure. Examples of the separator 40 include a single layer body of a film consisting of polyolefin such as polyethylene or polypropylene; a stretched film of a laminate and a mixture of the foregoing resins; and fibrous nonwoven fabric made of at least one kind of constituent materials selected from the group consisting of cellulose, polyester, polyacrylonitrile, polyamide, polyethylene, and polypropylene.

In place of the separator 40, a solid electrolyte layer may be provided. When a solid electrolyte layer is used, an electrolytic solution is no longer necessary. A solid electrolyte layer and the separator 40 may be used together.

For example, the solid electrolyte is an ion conductive layer of which the ion conductivity is $1.0\times10^{-8}$ S/cm or higher and $1.0\times10^{-2}$ S/cm or lower. For example, the polymer solid electrolyte is an electrolyte in which an alkali metal salt is dissolved in a polyethylene oxide-based polymer. For example, the oxide-based solid electrolyte is $Li_{1.3}Al_{0.3}Ti_{1.7}(PO_4)_3$ (NASICON type), $Li_{1.07}Al_{0.69}Ti_{1.46}(PO_4)_3$ (glass ceramics), $Li_{0.34}La_{0.51}TiO_{2.94}$ (Perovskite type), $Li_7La_3Zr_2O_{12}$ (garnet type), $Li_{2.9}PO_{3.3}N_{0.46}$ (amorphous, LIPON), $50Li_4SiO_4.50Li_2BO_3$ (glass), or $90Li_3BO_3.10Li_2SO_4$ (glass ceramics). For example, the sulfide-based solid electrolyte is $Li_{3.25}Ge_{0.25}P_{0.75}S_4$ (crystal), $Li_{10}GeP_2S_{12}$ (crystal, LGPS), $Li_6PS_5Cl$ (crystal, argyrodite type), $Li_{9.54}Si_{1.74}P_{1.44}S_{11.7}Cl_{0.3}$ (crystal), $Li_{3.25}P_{0.95}S_4$ (glass ceramics), $Li_7P_3S_{11}$ (glass ceramics), $70Li_2S\cdot30P_2S_5$ (glass), $30Li_2S_{26}B_2S_3\cdot44LiI$ (glass), $50Li_2S_{17}P_2S_5\cdot33LiBH_4$ (glass), $63Li_2S_{36}SiS_2.Li_3PO_4$ (glass), or $57Li_2S\cdot38SiS_{2.5}Li_4SiO_4$ (glass).

Next, a method for manufacturing a power storage element will be described. First, the first metal layer 12 and the second metal layer 13 are formed on both surfaces of a commercially available resin film. For example, the first metal layer 12 and the second metal layer 13 can be formed by a sputtering method, a chemical vapor deposition method (CVD method), or the like.

Next, a surface of one metal layer (first metal layer 12) is coated with positive electrode slurry. The positive electrode slurry is obtained by mixing positive electrode active materials, binders, and a solvent and making the mixture into a paste. For example, the positive electrode slurry can be coated by a slit die coating method, a doctor blade method, or the like.

A solvent in the positive electrode slurry after coating is removed. A removal method is not particularly limited. For example, the current collector 10 coated with the positive electrode slurry is dried at a temperature of 80° C. to 150° C. in an atmosphere. Next, the obtained coated film is pressed so as to increase the density of the positive electrode active material layer 20. For example, regarding the pressing device, a roll press machine, an isostatic pressing machine, or the like can be used.

Next, a surface of the metal layer (second metal layer 13) on a side opposite to the surface coated with the positive electrode slurry is coated with negative electrode slurry. The negative electrode slurry is obtained by mixing negative electrode active materials, binders, and a solvent and making the mixture into a paste. The negative electrode slurry can be coated by a method similar to that of the positive electrode slurry. A solvent in the negative electrode slurry after coating is removed by drying; and thereby, the negative electrode active material layer 30 is obtained. When the negative electrode active materials are metal lithium, a lithium foil may be adhered to the second metal layer 13.

Next, portions of the positive electrode active material layer 20 and the negative electrode active material layer 30 are removed, the tab t1 is bonded to the first metal layer 12, and the tab t2 is bonded to the second metal layer 13. For example, the tabs t1 and t2 are welded to the metal layers by ultrasonic waves. The tabs t1 and t2 may be bonded to the metal layers, may be screwed thereto, or may be welded thereto by heat or the like.

Next, the separator 40 is provided at a position where it comes into contact with the positive electrode active material layer 20 or the negative electrode active material layer 30, and the resultant laminate is wound around one end side as an axis. Thereafter, the electrode body 100 together with an electrolytic solution are sealed inside the exterior body C. Sealing is performed while decompression and heating are performed so that the electrolytic solution is impregnated into the electrode body 100. After the exterior body C is sealed by heat or the like, the power storage element 200 is obtained.

In the power storage element 200 according to the first embodiment, the innermost portion and the outermost portion consist of the resin layer 11 and the separator 40. Therefore, even when a nail or the like is stuck in the electrode body 100, the nail or the like is entwined with the resin layer 11 and the separator 40, and thus a short circuit between the positive electrode Cd and the negative electrode Ad is prevented. For this reason, abnormal heat generation of the power storage element 200 can be curbed. This is because a conductive object such as a nail which may cause a short circuit is covered with the resin layer 11 so that it becomes a resistor due to decrease in conductivity. Therefore, a rapid current flow via the nail or the like and heat generation thereof can be curbed.

In the foregoing example, an example in which the innermost portion and the outermost portion of the electrode body 100 consist of the resin layer 11 and the separator 40 has been described, but any one thereof may consist of the resin layer 11 and the separator 40. When the innermost portion of the electrode body 100 consists of the resin layer 11 and the separator 40, the first end of the current collector 10 does not include the first metal layer 12 and the second metal layer 13, and the resin layer 11 and the separator 40 protrude in the x direction with respect to the first metal layer 12 and the second metal layer 13. When the outermost portion of the electrode body 100 consists of the resin layer 11 and the separator 40, the second end of the current collector 10 does not include the first metal layer 12 and the second metal layer 13, and the resin layer 11 and the separator 40 protrude in the x direction with respect to the first metal layer 12 and the second metal layer 13.

Second Embodiment

Figure 5:
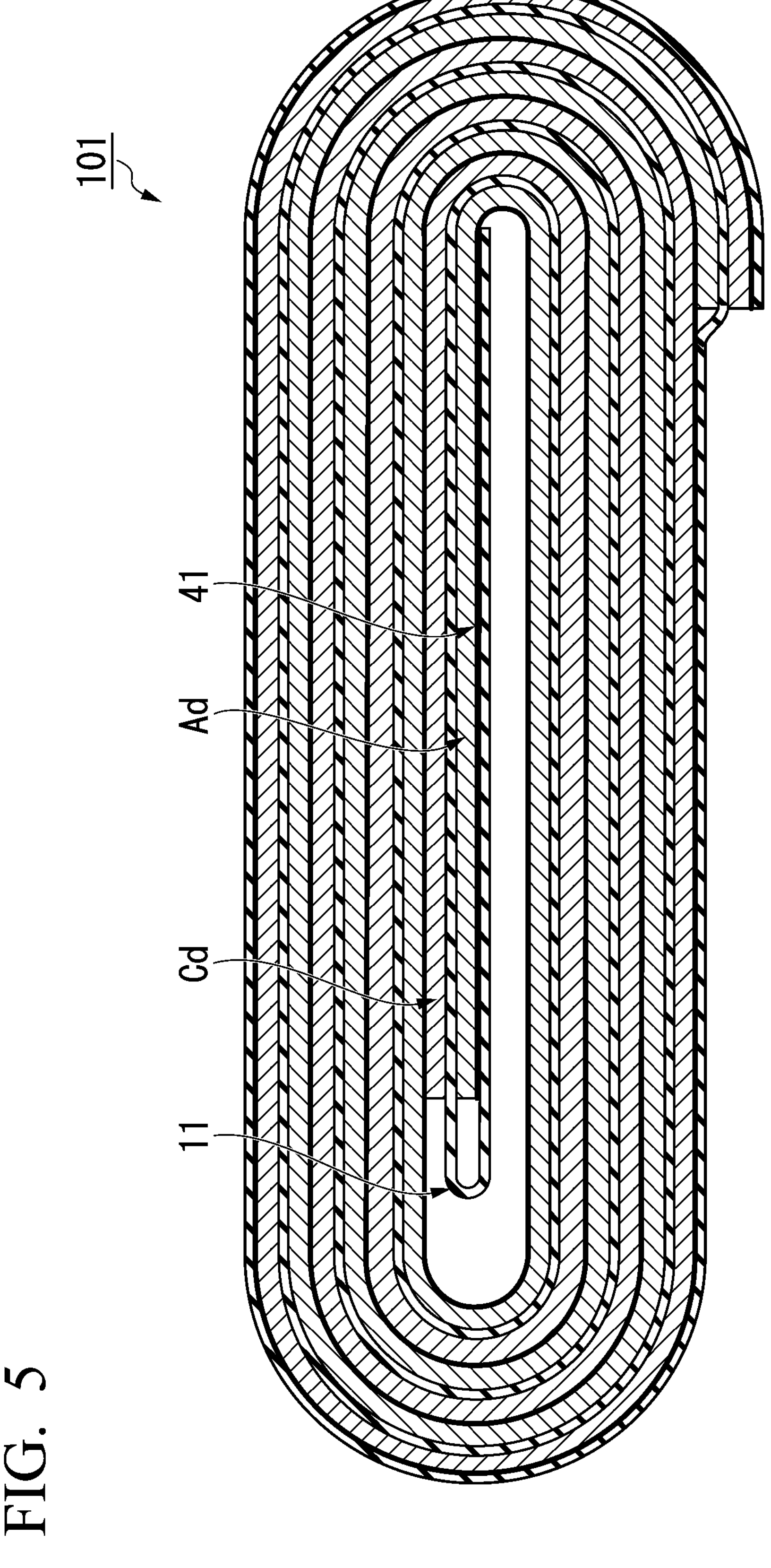
FIG. 5 is a cross-sectional view of an electrode body according to the second embodiment.
Figure 6:
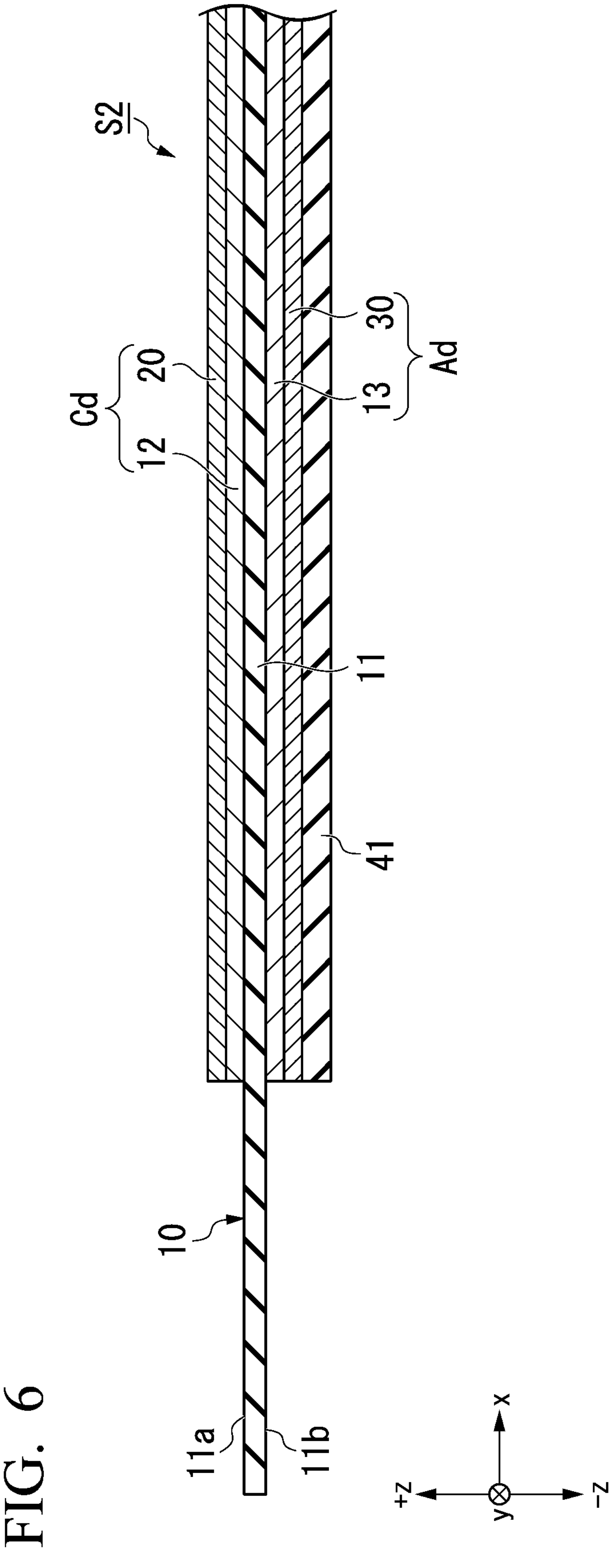
FIG. 6 is a cross-sectional view of a first end of a battery sheet in the developed electrode body according to the second embodiment.
Figure 7:
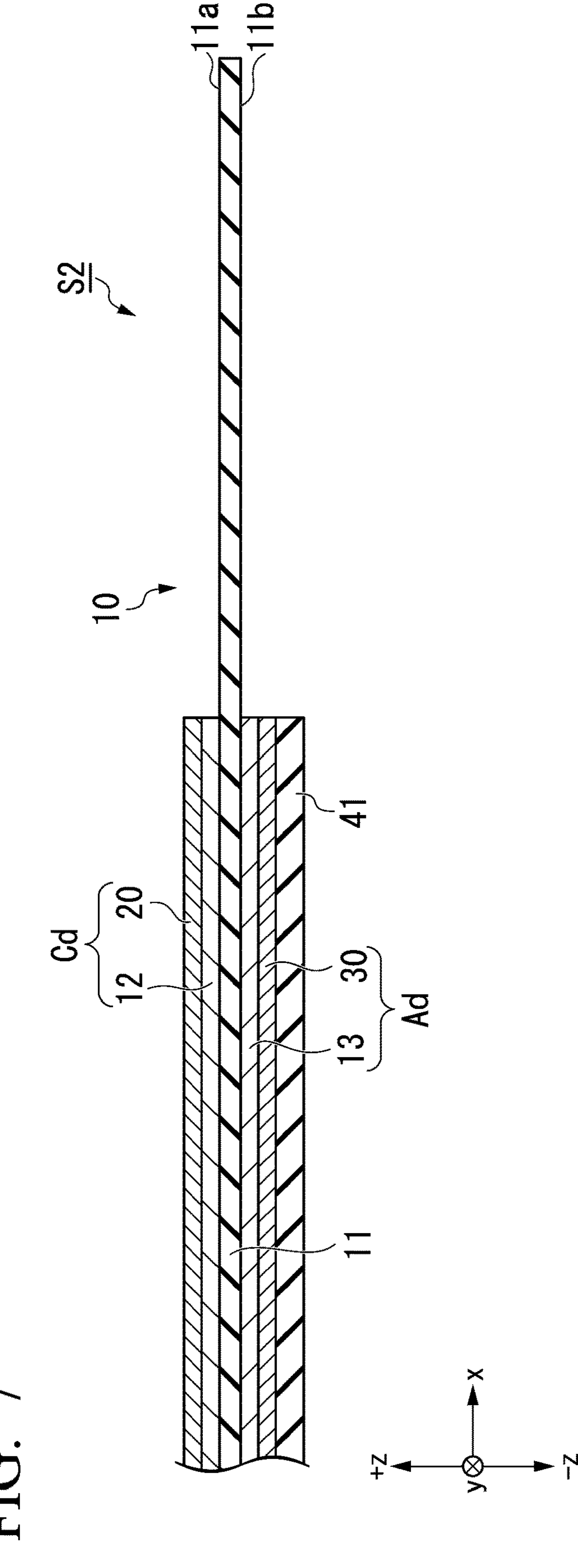
FIG. 7 is a cross-sectional view of a second end of the battery sheet in the developed electrode body according to the second embodiment.

FIG. 5 is a cross-sectional view of an electrode body 101 according to a second embodiment. FIG. 6 is a cross-sectional view of a first end of a battery sheet S2 in the developed electrode body 101 according to the second embodiment. FIG. 7 is a cross-sectional view of a second end of the battery sheet S2 in the developed electrode body 101 according to the second embodiment.

In the electrode body 101 according to the second embodiment, the shape of a separator 41 differs from that of the separator 40 in the electrode body 100 according to the first embodiment. In the electrode body 101 according to the second embodiment, regarding constitutions similar to those of the electrode body 100 according to the first embodiment, description thereof will be omitted.

The battery sheet S2 includes the current collector 10, the positive electrode active material layer 20, the negative electrode active material layer 30, and the separator 41. The separator 41 differs from the separator 40 in that the separator 41 does not protrude in the x direction with respect to the first metal layer 12 and the second metal layer 13 at the first end and the second end. Other constitutions of the separator 41 are similar to those of the separator 40.

The first end of the battery sheet S2 consists of the resin layer 11. The innermost portion of the electrode body 101 consists of the resin layer 11. The second end of the battery sheet S2 consists of the resin layer 11. The outermost portion of the electrode body 101 consists of the resin layer 11.

In the electrode body 101 according to the second embodiment, the innermost portion and the outermost portion consist of the resin layer 11. Therefore, even when a nail or the like is stuck in the electrode body 101, the nail or the like is entwined with the resin layer 11, and thus a short circuit between the positive electrode Cd and the negative electrode Ad is curbed. For this reason, abnormal heat generation of the power storage element is curbed.

In the foregoing example, an example in which the innermost portion and the outermost portion of the electrode body 100 consist of the resin layer 11 has been described, but any one thereof may consist of the resin layer 11.

Third Embodiment

Figure 8:
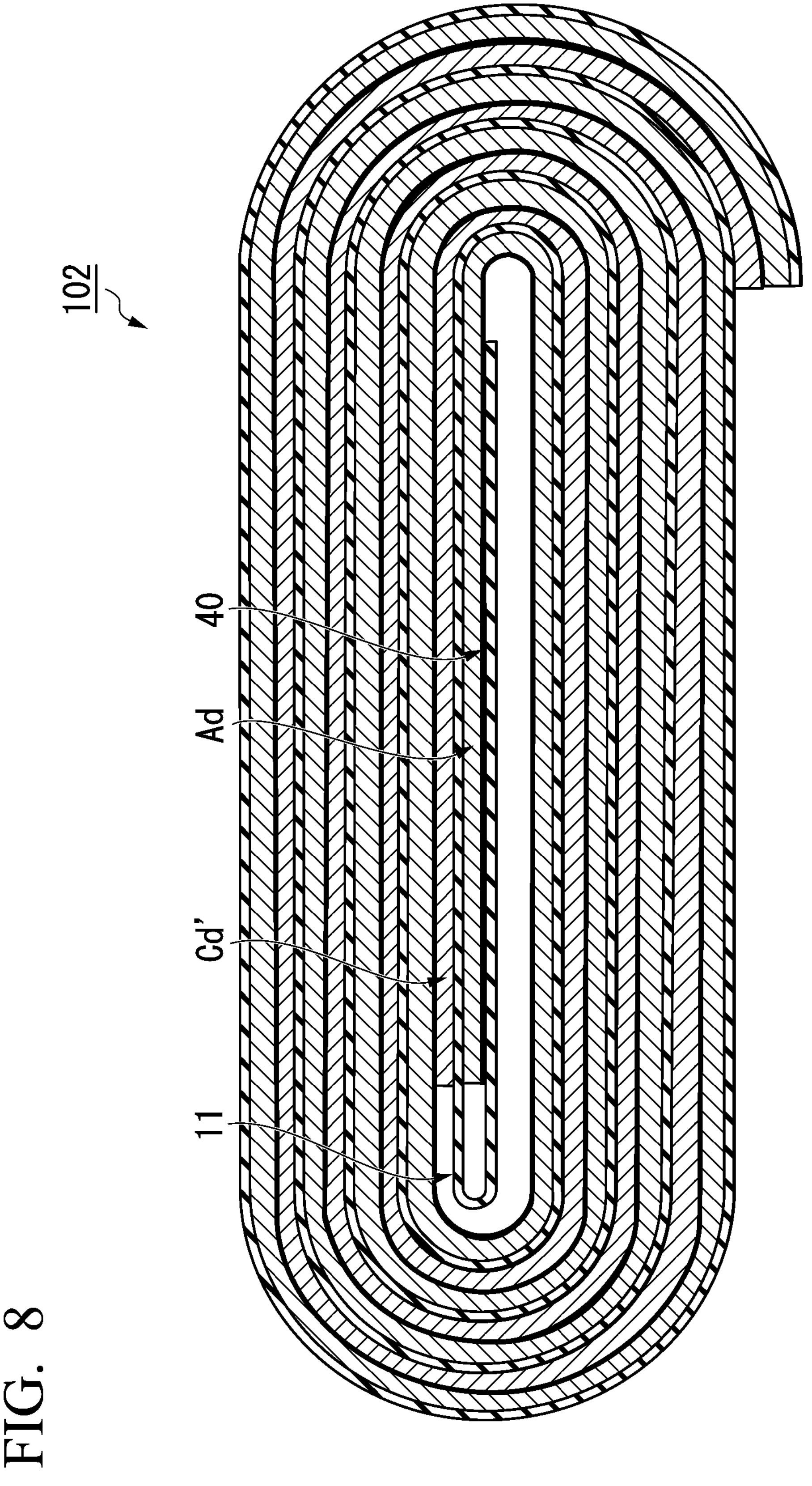
FIG. 8 is a cross-sectional view of an electrode body according to a third embodiment.
Figure 9:
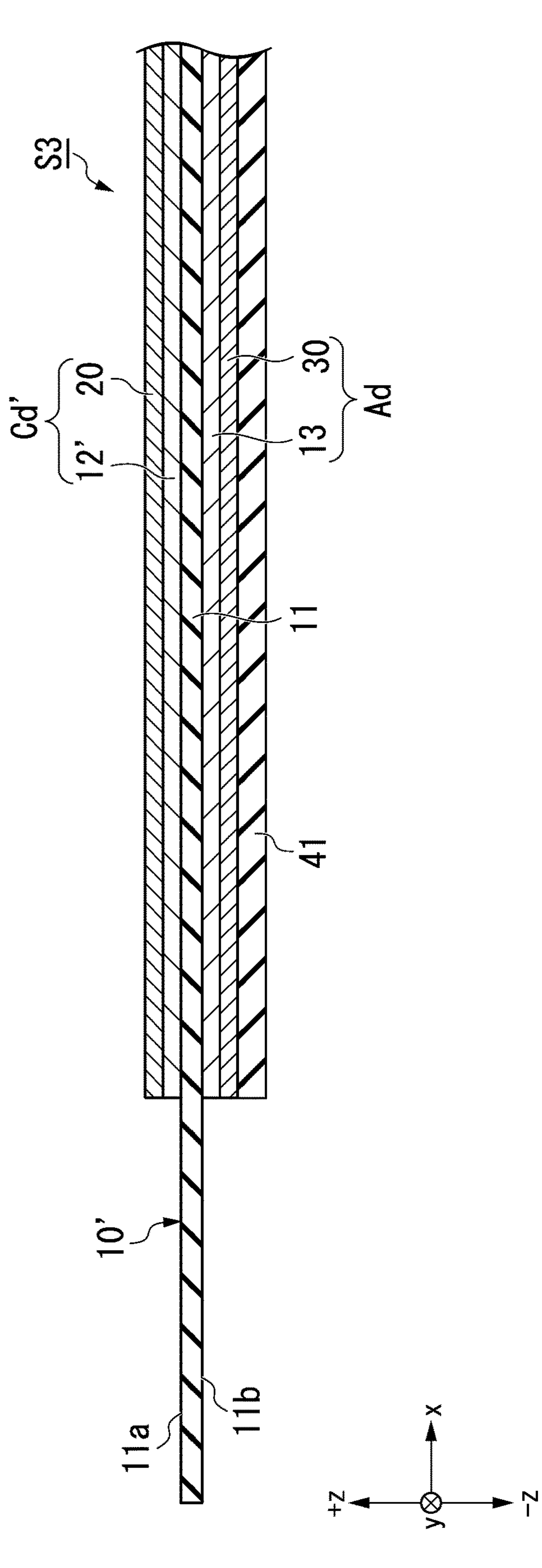
FIG. 9 is a cross-sectional view of a first end of a battery sheet in the developed electrode body according to the third embodiment.
Figure 9:
Figure 10:
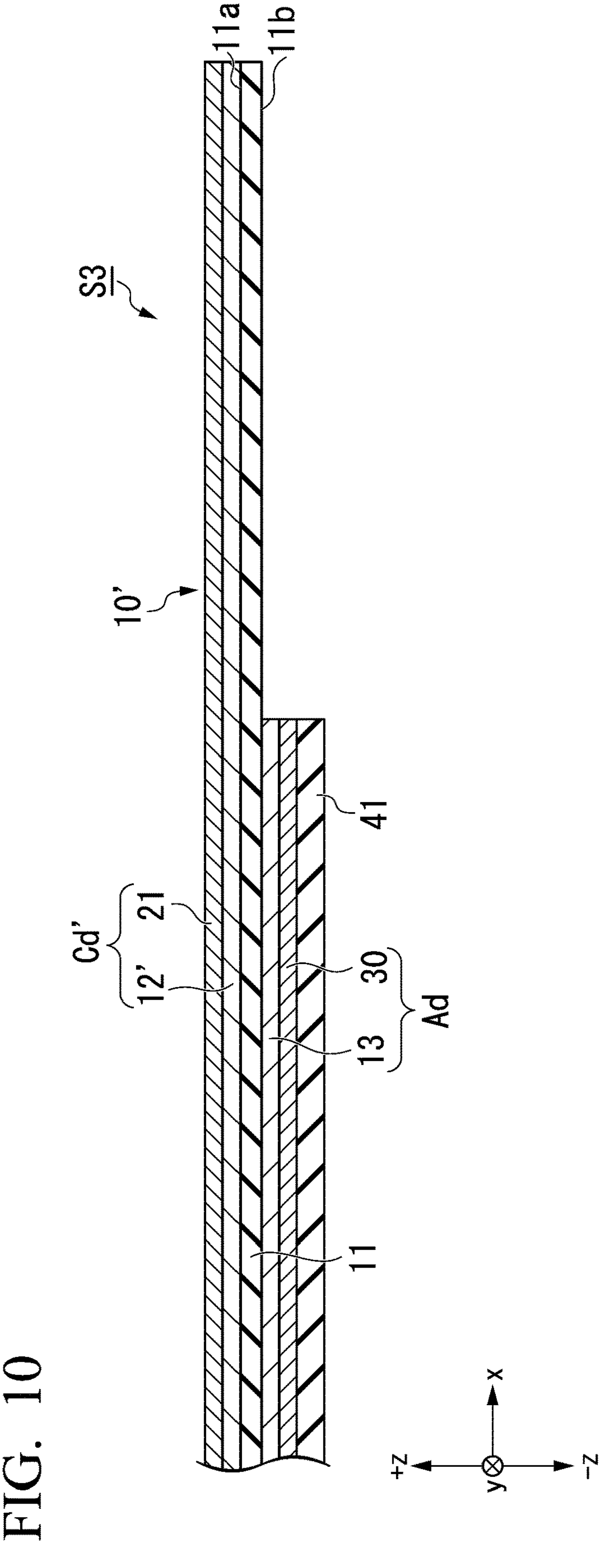
FIG. 10 is a cross-sectional view of a second end of the battery sheet in the developed electrode body according to the third embodiment.

FIG. 8 is a cross-sectional view of an electrode body 102 according to a third embodiment. FIG. 9 is a cross-sectional view of a first end of a battery sheet S3 in the developed electrode body 102 according to the third embodiment. FIG. 10 is a cross-sectional view of a second end of the battery sheet S3 in the developed electrode body 102 according to the third embodiment.

In the electrode body 102 according to the third embodiment, the constitution of a positive electrode Cd' differs from that in the electrode body 101 according to the second embodiment. In the electrode body 102 according to the third embodiment, regarding constitutions similar to those of the electrode body 101 according to the second embodiment, description thereof will be omitted.

The battery sheet S3 includes a current collector 10', a positive electrode active material layer 21, the negative electrode active material layer 30, and the separator 41. The current collector 10' includes the resin layer 11, a first metal layer 12', and the second metal layer 13. The first metal layer 12' and the positive electrode active material layer 21 form the positive electrode Cd'. The first metal layer 12' and the positive electrode active material layer 21 differ from the first metal layer 12 and the positive electrode active material layer 20 in that the first metal layer 12' and the positive electrode active material layer 21 cover the first surface 11*a* of the resin layer 11 up to the second end of the battery sheet S3. Other constitutions of the first metal layer 12' and the positive electrode active material layer 21 are similar to those of the first metal layer 12 and the positive electrode active material layer 20.

The first end of the battery sheet S3 consists of the resin layer 11. The innermost portion of the electrode body 102 consists of the resin layer 11. The structure of the first end of the battery sheet S3 is similar to the structure of the first end of the battery sheet S2.

The second end of the battery sheet S3 consists of the resin layer 11 and the positive electrode Cd'. The surface of the battery sheet S3 on the lower side in the diagram is on the outward winding side of the electrode body 102. The second metal layer 13 is not laminated on the second surface on the outward winding side of the current collector 10'. The second surface 11*b* on the outward winding side of the resin layer 11 is exposed at the second end of the current collector 10'. As a result, the resin layer 11 is exposed in the outermost portion of the electrode body 102.

In the electrode body 102 according to the third embodiment, the innermost portion and the outermost portion consist of the resin layer 11. Therefore, even when a nail or the like is stuck in the electrode body 101, the nail or the like is entwined with the resin layer 11, and thus a short circuit between the positive electrode Cd and the negative electrode Ad is prevented. For this reason, abnormal heat generation of the power storage element is curbed.

In the foregoing example, an example in which the innermost portion and the outermost portion of the electrode body 102 consist of the resin layer 11 has been described, but any one thereof may consist of the resin layer 11.

EXAMPLES

Example 1

(Production of Current Collector)

First, as a resin layer, a PET film having a thickness of 6.0 μm was cut to have a length of 100 mm and a width of 10 mm. Next, aluminum having a thickness of 1.0 μm was laminated as a first metal layer on the first surface of the resin layer. Aluminum was not laminated in a range from the first end of the resin layer to 20 mm away from the first end of the resin layer in the x direction. Next, copper having a thickness of 1.0 μm was laminated as a second metal layer on the second surface of the resin layer. The second metal layer was laminated on the entire second surface of the resin layer.

(Production of Positive Electrode Active Material Layer)

Lithium cobaltate ($LiCoO_2$) was used as a positive electrode active material. A slurry was prepared by dispersing 1.90 parts by mass of this positive electrode active material, 5 parts by mass of acetylene black, and 5 parts by mass of polyvinylidene fluoride (PVDF) into N-methyl-2-pyrrolidone (NMP). The obtained slurry was coated on a part in which the aluminum was laminated on the PET film. Thereafter, it was dried at a temperature of 140° C. for 30 minutes. Thereafter, it was pressed using a roll press apparatus to obtain a positive electrode active material layer.

(Production of Negative Electrode Active Material Layer)

A slurry was prepared by dispersing 90 parts by mass of natural graphite powder (negative electrode active material) and 10 parts by mass of PVDF into NMP. The obtained slurry was coated on a part in which copper was laminated on the PET film. Thereafter, it was dried under reduced pressure at a temperature of 140° C. for 30 minutes. Thereafter, it was pressed using a roll press apparatus to obtain a negative electrode active material layer.

(Preparation of Separator)

A polyethylene microporous film (porosity: 40%, shutdown temperature: 134° C.) having a film thickness of 20 μm was prepared.

(Production of Electrode Body)

Portions of the positive electrode active material layer and the negative electrode active material layer were scraped off with a cotton swab soaked in methyl ethyl ketone (MEK), and tabs were connected thereto. Next, the separator was put on one surface of the battery sheet and the resultant laminate was wound around the first end of the resin layer as an axis; and thereby, an electrode body was produced. The first end of the battery sheet consisted of a resin layer. The second end of the battery sheet consisted of a resin layer, a first metal layer, a second metal layer, a positive electrode active material layer, a negative electrode active material layer, and a separator. The innermost portion of the electrode body consisted of a resin layer. The outermost portion of the electrode body was a battery sheet consisted of a resin layer, a first metal layer, a second metal layer, a positive electrode active material layer, a negative electrode active material layer, and a separator.

(Electrolytic Solution)

As an electrolyte, a nonaqueous electrolyte solution was prepared by dissolving $LiPF_6$ at 1.0 mol/L in a mixed solvent of ethylene carbonate (EC) and diethyl carbonate (DEC). The volume ratio between the EC and the DEC in the mixed solvent was EC:DEC=30:70.

(Production of Battery)

A battery cell of Example 1 was produced by sealing the electrode body together with a nonaqueous electrolytic solution in an aluminum laminate.

(Measurement of Surface Temperature of Battery)

The produced battery cell of Example 1 was charged up to 4.3 V (vs. $Li/Li^+$) (charge stop voltage) at a constant current density of 0.1 C. Moreover, the constant voltage of 4.3 V (vs. $Li/Li^+$) was maintained, and constant-voltage charging was performed such that the current value fell to the current density of 0.05 C. Measurement was performed under a condition where 1 C of the current density was set to 158 mA/g. Further, the surface reaching temperature of the battery was measured.

(Nail Sticking Test)

A nail sticking test was performed by sticking a nail having a diameter of 2.5 mm at a speed of 150 mm/s in a battery in a charged state. The nail sticking test was performed in two patterns such as a first pattern in which a nail was caused to penetrate a battery cell and a second pattern in which a nail was stopped in the middle of the battery cell. Table 1 shows the results of the nail sticking test.

Example 2

Example 2 differed from Example 1 in its structures of the first end and the second end of the battery sheet. The first end of the battery sheet of Example 2 consisted of a resin layer, a first metal layer, a second metal layer, a positive electrode active material layer, a negative electrode active material layer, and a separator. The second end of the battery sheet of Example 2 consisted of a resin layer. The innermost portion of the electrode body was a battery sheet consisting of a resin layer, a first metal layer, a second metal layer, a positive electrode active material layer, a negative electrode active material layer, and a separator. The outermost portion of the electrode body consisted of a resin layer. The structures of the first end and the second end of the battery sheet were changed by changing the region for film formation of aluminum and copper when a current collector was produced. Table 1 shows the results of the nail sticking test for the battery of Example 2.

Example 3

Example 3 differed from Example 1 in its structures of the first end and the second end of the battery sheet. The first end of the battery sheet of Example 3 consisted of a resin layer. The second end of the battery sheet of Example 3 consisted of a resin layer. The innermost portion of the electrode body consisted of a resin layer. The outermost portion of the electrode body consisted of a resin layer. The structures of the first end and the second end of the battery sheet were changed by changing the region for film formation of aluminum and copper when a current collector was produced. Table 1 shows the results of the nail sticking test for the battery of Example 3.

Comparative Example 1

Comparative Example 1 differed from Example 1 in its structures of the first end and the second end of the battery sheet. The first end of the battery sheet of Comparative Example 1 consisted of a resin layer, a first metal layer, a second metal layer, a positive electrode active material layer, a negative electrode active material layer, and a separator. The second end of the battery sheet of Comparative Example 1 consisted of a resin layer, a first metal layer, a second metal layer, a positive electrode active material layer, a negative electrode active material layer, and a separator. The innermost portion of the electrode body was a battery sheet consisted of a resin layer, a first metal layer, a second metal layer, a positive electrode active material layer, a negative electrode active material layer, and a separator. The outermost portion of the electrode body was a battery sheet consisted of a resin layer, a first metal layer, a second metal layer, a positive electrode active material layer, a negative electrode active material layer, and a separator. The structures of the first end and the second end of the battery sheet were changed by changing the region for film formation of aluminum and copper when a current collector was produced. Table 1 shows the results of the nail sticking test for the battery of Comparative Example 1.

TABLE 1

| | Electrode body | | Nail sticking test | |
|---|---|---|---|---|
| | Innermost portion | Outermost portion | First pattern | Second pattern |
| Example 1 | Resin layer | Battery sheet | C | B |
| Example 2 | Battery sheet | Resin layer | B | C |
| Example 3 | Resin layer | Resin layer | A | A |
| Comparative Example 1 | Battery sheet | Battery sheet | C | C |

In Table 1, A indicates the surface temperature of the battery being 50° C. or lower, B indicates that the surface temperature of the battery being higher than 51° C. and lower than 100° C., and C indicates that the surface temperature of the battery being 100° C. or higher. In Examples 1 to 3 of which the innermost portion or the outermost portion of the electrode body was a resin layer, the battery temperature was lower than that of Comparative Example 1.

EXPLANATION OF REFERENCE SIGNS

10, 10' Current collector
11 Resin layer
12, 12' First metal layer
13 Second metal layer
20, 21 Positive electrode active material layer
30 Negative electrode active material layer
40, 41 Separator
100 Electrode body
200 Power storage element
Ad Negative electrode
Cd, Cd' Positive electrode
C Exterior body
K Accommodation space
S1, S2, S3 Battery sheet
T1, t2 Tab

What is claimed is:

1. An electrode body in which a battery sheet is wound around a first end thereof as an axis, wherein the battery sheet includes:

a current collector which includes, as a resin layer, a first layer having a first surface and a second surface facing a side opposite to the first surface and including a resin, a first metal layer on the first surface of the first layer, and a second metal layer on the second surface of the first layer;

a first active material layer which is laminated on the first metal layer;

a second active material layer which is laminated on the second metal layer; and a separator or a solid electrolyte layer which comes into contact with at least one of the first active material layer and the second active material layer, and wherein in at least a portion on the first surface and the second surface of the first layer at the first end corresponding to an inward winding side of a roll of the current collector, the first end of the battery sheet consists of the first layer and the separator;

on a surface of either of the first surface or the second surface of the first layer which is on an outward side of the roll at a second end corresponding to an outward winding side of the roll of the current collector, the second end of the battery sheet consists of the first layer and the separator; and the first layer of the current collector has exposed portions in the first end and the second end of the battery sheet.

2. The electrode body according to claim 1, wherein the first layer is an insulating layer of $1.0\times10^9$ Ω·cm or higher.

3. The electrode body according to claim 1, wherein the first layer includes any one selected from the group consisting of polyethylene terephthalate (PET), polyimide (PI), polyamide imide (PAI), polypropylene (PP), and polyethylene (PE).

4. The electrode body according to claim 1, wherein each of the first metal layer and the second metal layer is any one selected from aluminum, nickel, stainless steel, copper, platinum, and gold.

5. The electrode body according to claim 1, wherein the first metal layer and the second metal layer include metals or alloys different from each other.

6. A power storage element comprising: the electrode body according to claim 1.

7. A power storage module comprising: the power storage element according to claim 6.

8. The electrode body according to claim 2, wherein the first layer includes any one selected from the group consisting of polyethylene terephthalate (PET), polyimide (PI), polyamide imide (PAI), polypropylene (PP), and polyethylene (PE).

* * * * *